Aug. 13, 1940.   L. B. HENDERSON   2,211,502
TENNIS AND OTHER LIKE RACKET HANDLE
Filed Feb. 6, 1939   2 Sheets-Sheet 1
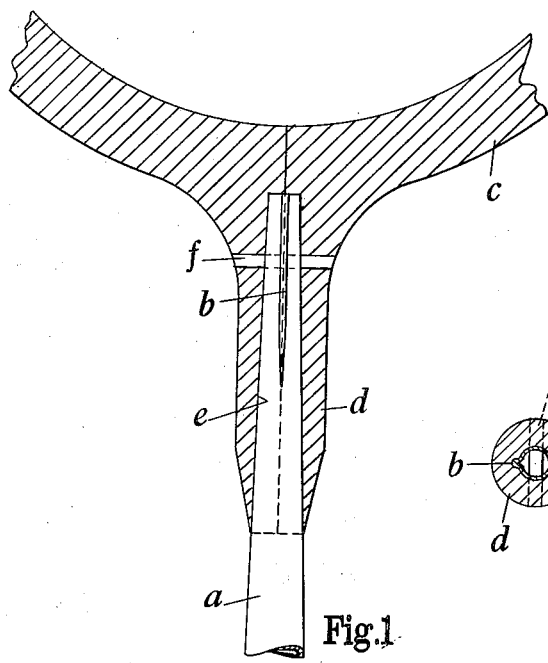
Fig.1
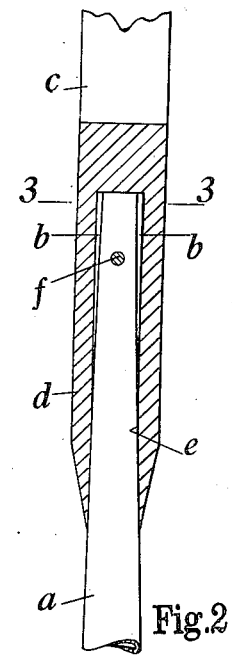
Fig.2
Fig.3
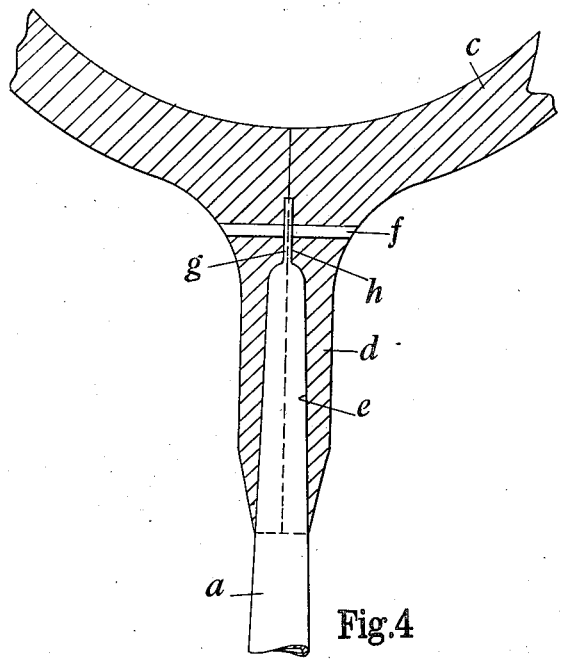
Fig.4
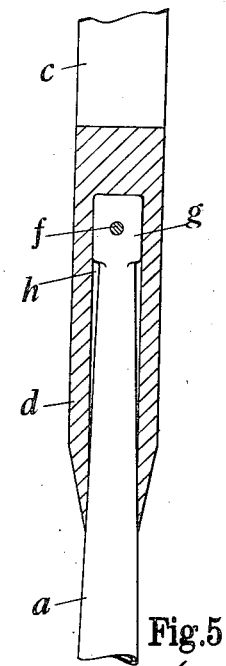
Fig.5
L. B. Henderson, Inventor
By: Glascock Downing & Seebold, Attys.

Aug. 13, 1940.  L. B. HENDERSON  2,211,502
TENNIS AND OTHER LIKE RACKET HANDLE
Filed Feb. 6, 1939  2 Sheets—Sheet 2

Patented Aug. 13, 1940

2,211,502

UNITED STATES PATENT OFFICE 2,211,502

TENNIS AND OTHER LIKE RACKET HANDLE

Leonard Bayliffe Henderson, Oldbury, Birmingham, England, assignor to Accles and Pollock Limited, Birmingham, England Application February 6, 1939, Serial No. 254,956
In Great Britain April 4, 1938

4 Claims. (Cl. 273—73)

This invention relates to tennis and other like racket handles, and has for its object to provide improved metal tubular handles which are adapted to afford a secure connection with the racket frame.

The invention comprises a handle made from tubular metal and having one end adapted for insertion in a complementary socket in a racket frame, the said end being formed with at least one key for effecting a non-rotatable connection between the handle and socket, and being adapted to be secured to the frame by at least one transverse fastening.

In the accompanying sheets of explanatory drawings:

Figures 1 and 2 are fragmentary elevations at right angles to each other of a racket handle provided with the invention and connected to a racket frame.

Figure 3 is a section on the line 3—3 of Figure 2.

Figures 4 and 5 are respectively similar views to Figures 1 and 2 illustrating a modified form of the invention.

In carrying the invention into effect as shown in Figures 1 to 3, I shape one end of a tubular metal handle $a$ to the form of a tapered spigot, and on this end I form by flattening it at appropriate positions a plurality of longitudinal ribs $b$ the outer edges of which are preferably parallel with each other. The racket frame $c$ is made from bent wood or metal having ends brought together to form a handle support $d$. The latter is formed with a socket $e$ shaped to correspond with the spigot and into which the spigot can be inserted tightly, the ribs $b$ serving as keys for effecting a non-rotatable connection between the handle and socket. When assembled the handle $a$ and frame $c$ are secured together by one or more fastenings as $f$ in the form of a rivet, peg or screw passing transversely through the handle support $d$ and handle $a$.

In the modification shown in Figures 4 and 5, the extremity of the tapered spigot end of the handle $a$ is formed with a flattened portion $g$ which is adapted, by engaging a complementary groove or slot $h$ in the end of the socket $e$ in the handle support $d$, to serve as a key for effecting a non-rotatable connection between the handle and socket, the handle $a$ and frame $c$ when assembled being secured together by a fastening $f$ in the form of a rivet, peg or screw inserted through the handle support $d$ and the flattened portion $g$ of the spigot.

Figure 6:
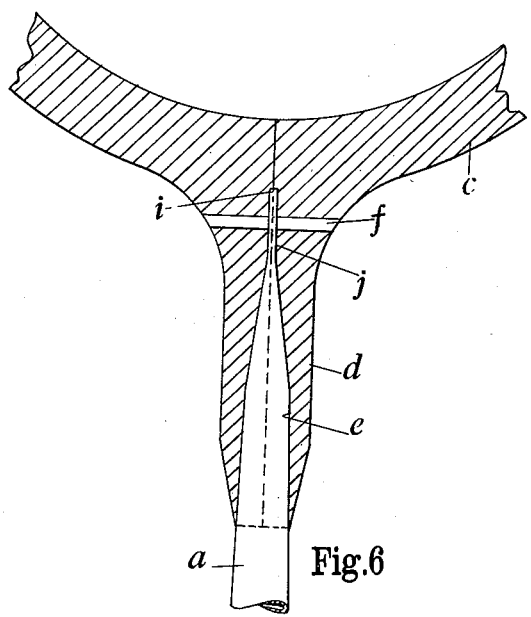
Figures 6 and 7 are respectively similar views to Figures 1 and 2 illustrating another modified form of the invention.
Figure 7:
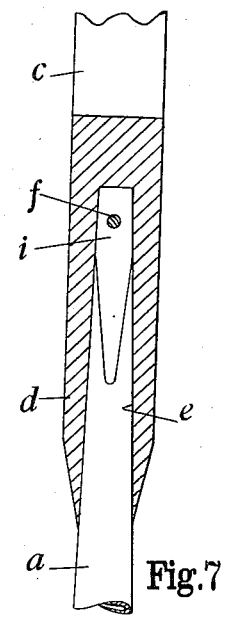

In the modification shown in Figures 6 and 7, the spigot end of the handle $a$ is initially of uniform taper, and its smaller end portion is subsequently shaped to a wedge like form having at its extremity a flattened portion $i$, the latter being adapted, by engaging a complementary groove or slot $j$ in the inner end of the socket $e$ in the handle support $d$, to serve as a key for effecting a non-rotatable connection between the handle and socket, and the handle $a$ and frame $c$ when assembled being secured together by a transverse fastening $f$ as in the example shown in Figures 4 and 5.

The handle $a$ in any of the examples above described may be made of circular, elliptical or polygonal cross section and it may be of parallel, stepped or tapered form along the portion extending beyond the handle support $d$.

The invention is not limited to the examples above described as other forms embodying the same essential features may be used.

Having thus described my invention what I claim as new and desire to secure by Letters Patent is:

1. A tennis or other like racket handle made from tubular metal and having a tapered end adapted for insertion in a complementary socket in a racket frame, the said end being formed with at least one flattened projecting portion which can serve as a key for effecting a non-rotatable connection between the handle and socket, and being adapted to be secured to the frame by at least one transverse fastening.

2. A racket handle as claimed in claim 1, in which the end for insertion in the socket is formed with flattened projecting portions in the form of longitudinal ribs.

3. A tennis or other racket handle made from tubular metal and having one end adapted for insertion in a complementary socket in a racket frame, the said end being provided at its extremity with a flat part for engaging a complementary recess in the inner end of the socket and thereby effecting a non-rotatable connection between the handle and socket, and being adapted to be secured to the frame by at least one transverse fastening.

4. A tennis or other racket handle made from tubular metal and having a tapered end adapted for insertion in a complementary socket in a racket frame, the said tapered end being provided at its extremity with a flat part for engaging a complementary recess in the inner end of the socket and thereby effecting a non-rotatable connection between the handle and socket, and being adapted to be secured to the frame by at least one transverse fastening.

LEONARD BAYLIFFE HENDERSON.